USOO5652899A

United States Patent [19]
Mays et al.

[11] Patent Number: 5,652,899
[45] Date of Patent: Jul. 29, 1997

[54] SOFTWARE UNDERSTANDING AID FOR GENERATING AND DISPLAYING SIMPLIFIED CODE FLOW PATHS WITH RESPECT TO TARGET CODE STATEMENTS

[75] Inventors: Robert George Mays, Chapel Hill; Thomas Michael Stubbs, Raleigh, both of N.C.

[73] Assignee: International Business Machines Corporation, Armonk, N.Y.

[21] Appl. No.: 397,803

[22] Filed: Mar. 3, 1995

[51] Int. Cl.$^6$ .................................................. G06F 11/30
[52] U.S. Cl. ........................ 395/773; 395/772; 395/704
[58] Field of Search ........................ 395/144, 650, 395/700, 161, 183.14, 772, 773, 704

[56] References Cited

U.S. PATENT DOCUMENTS

| | | | |
|---|---|---|---|
| 4,730,315 | 3/1988 | Saito et al. | 395/183.14 |
| 4,819,233 | 4/1989 | Delucia et al. | 395/183.14 |
| 4,833,641 | 5/1989 | Lerner | 395/650 |
| 4,872,167 | 10/1989 | Maezawa | 395/183.14 |
| 4,943,968 | 7/1990 | Hirose et al. | 395/183.14 |
| 5,210,859 | 5/1993 | Aoshima et al. | 395/183.22 |
| 5,297,150 | 3/1994 | Clark | 395/183.02 |
| 5,307,493 | 4/1994 | Gusenius | 395/700 |
| 5,357,452 | 10/1994 | Pio-di-Savoia et al. | 364/579 |
| 5,375,125 | 12/1994 | Oshima et al. | 395/183.14 |
| 5,410,648 | 4/1995 | Pazel | 395/158 |
| 5,423,027 | 6/1995 | Jackson | 395/575 |
| 5,430,873 | 7/1995 | Abe et al. | 395/650 |
| 5,446,838 | 8/1995 | Kimelman | 395/161 |
| 5,446,900 | 8/1995 | Kimelman | 395/700 |
| 5,450,586 | 9/1995 | Kuzara et al. | 395/700 |
| 5,490,249 | 2/1996 | Miller | 395/183.14 |

OTHER PUBLICATIONS

Gallagher et al., "Software Safety and Program Slicing", Computer Assurance: COMPAS '93, pp. 71–80.
Lanubile et al., "An environment for the reengineering of Pascal programs", Software Maintenance, 1991 Conference, pp. 23–30.
Duncan, "Creating CASE tools by re-enginerring ADA compilers", National Aerospace and Electronics, 1993, pp. 496–499.
Signore, "Charon: a tool for code redocumentation and re-engineering", Program Comprehension, 1993 Workshop, pp. 169–176.
Sommerville, "PCL—A language for modelling system architecture", IEE Colloq. (1994) No. 211: Reverse Engineering for Software Based Systems, pp. 3/1 to 3/3.
Compilers: Principles, Techniques, and Tools; Aho et al; Addison-Wesley; 1986; pp. 180–195.

*Primary Examiner*—Heather R. Herndon
*Assistant Examiner*—Stephen Hong
*Attorney, Agent, or Firm*—Jerry W. Herndon

[57] ABSTRACT

A process implemented in a computer parses source code and displays simplified views of the source code for assistance to a programmer in understanding the instruction flow through the software. The process generates software source code path flow displays relative to a target statement of a source code document and displays these simplified views to a user. The user selects a target statement, perferably interactively by marking a statement on a source code display on a monitor. The underlying process then identifies the target statement in memory; each statement of the source code is thereafter examined to determine if the statement resides in the logic flow path to the target statement, does not reside in the logic flow path to the target statement, or is undefined with respect to whether or not it resides in the logic flow path to the target statement. Each source code statement is then marked as to the logic flow path determination of the examining step. Finally, the simplified displays of the source code document are generated based on the markings of the source code statements.

51 Claims, 9 Drawing Sheets

```
T - 1    INT TEST (){
T - 3        IF (LIMIT>100){
T - 4            B=Y;
T - 5            A=Z;
U - 7            IF (B>C) SUB1();
U - 8                ELSE SUB2();
F - 10           IF (A>=B+C) X=1;
T - 11               ELSE X=2;        -----TARGET STATEMENT-----
T - 12       }
F - 13       ELSE X=3;
T - 15       PRINTF (THE VALUE OF X IS %!",X);
T - 16   }
```

```
T - 1    INT TEST (){
T - 3        IF (LIMIT>100){
T - 4            B=Y;
T - 5            A=Z;
U - 7            IF (B>C) SUB1();
U - 8                ELSE SUB2();
F - 10           IF (A>=B+C) X=1;
T - 11               ELSE X=2;        -----TARGET STATEMENT-----
T - 12       }
F - 13       ELSE X=3;
T - 15       PRINTF (THE VALUE OF X IS %I",X);
T - 16   }
```

```
1        INT TEST (){
---
3            IF (LIMIT>100){
---
11               ELSE X=2;        -----TARGET STATEMENT-----
12       }
---
16   }
```

SOFTWARE UNDERSTANDING AID FOR GENERATING AND DISPLAYING SIMPLIFIED CODE FLOW PATHS WITH RESPECT TO TARGET CODE STATEMENTS

TECHNICAL FIELD

This invention relates to program module processing and program understanding tools and, more particularly, to tools for displaying source program flow in simplified ways to further aid programmer understanding of software.

BACKGROUND OF THE INVENTION

The rapid increase in the size, complexity and availability of computer programs has significantly increased the importance and the cost of maintaining and enhancing such programs. Errors in such programs ("bugs") or desired enhancements both require that the base code be fully understood, even after many years of use. It is well known that even the author of such code seldom understands the details of his or her own source code after a modest period of time. It is therefore common for the generator of original code to document the code by annotations in the program, by flowcharts, cross-references, variable definition lists, symbol-where-used-extracts, program slicing, selective highlighting of code, etc. These techniques are described in "Converting Legacy Code Into ADA: A Cognitive Approach," by J. M. Scandura, *Computer* 27, No. 4., pp. 55–61, April 1994, "Using an Enabling Technology to Reengineer Legacy Systems," by L. Markosian et al., *Communications of the ACM* 37, No. 5, pp. 58–70; May 1994, "Automated Support for Legacy Code Understanding," by J. Q. Ning et al, *Communications of the ACM* 37, No. 5, pp. 50–57, May 1994, "Program Understanding: Challenge for the 1990s," by T. A. Corbi, *IBM Systems Journal* 28, No 2, pp. 294–306, 1989, "From Program Comprehension to Tool Requirements for an Industrial Environment," by A. von Mayrhauser et al., *Proceedings: IEEE Second Workshop on Program Comprehension*, (Capri, Italy), pp. 78–86, IEEE Computer Society Press, Los Alamitos, Calif. (1993), and "Software Maintenance Crisis Resolution: The New IEEE Standard," by M. Lerner, *Software Development* 2, No 8, pp. 65–72, August 1994.

Numerous machine tools have become available for the analysis and understanding of source code. One type of tool is directed to assisting a user in understanding program flow through various routines and procedures that comprise a program. Tools of this type use a technique called program slicing to identify flow, or logic, paths to a target program statement. There are numerous references to program slicing in the literature. One reference, entitled *Function Recovery Based on Program Slicing*, F. Lanubile et al, Conference Proceedings on Software maintenance (CSM-93), (Sep. 27–30, 1993), IEEE Computer Society Press, discusses slicing in general and some variations thereto. Program slicing involves specifying a target program statement and a variable associated with the target statement. The program slice is then the smallest subset of statements of the entire program which include the target statement and which affect the value of the target variable. Thus a program slice involves all the statements on the paths to the target statement, plus many additional statements that are involved, directly or indirectly, in the resulting value of the target variable.

A common complaint is that program slicing produces far too much output in practical applications to the point that almost all statements in the program may be selected because of the variable dependencies affecting the target variable. With so much output produced, the program slice has not proven useful in answering the programmer's problems in many cases.

SUMMARY OF THE INVENTION

In accordance with the illustrative embodiment of the present invention, a process implemented in a computer parses the code and displays simplified views of the source code for assistance to a programmer in understanding the instruction flow through the software. The process generates software source code path flow displays relative to a target statement of a source code document and displays these simplified views to a user. The user selects a target statement, perferably interactively by marking a statement on a source code display on a monitor. The underlying process then identifies the target statement in memory; each statement of the source code is thereafter examined to determine if the statement resides in the logic flow path to the target statement, does not reside in the logic flow path to the target statement, or is undefined with respect to whether or not it resides in the logic flow path to the target statement. Each source code statement is then marked as to the logic flow path determination of the examining step. Finally, the simplified displays of the source code document are generated based on the markings of the source code statements.

With this process, only a reduced or minimized set of statements that form paths to the target statement are produced. Frequently this set is all that is needed to address a programmer's problem. Alternatively, the programmer may use one of the path marking outputs to perform additional manual queries which trace back variable usage, one step at a time, until his/her problem has been answered. This way the path marking provides an initial framework for fuller program comprehension.

One good example illustrating the difference between the path marking of this invention and slicing would be the statements in a called routine. Consider the following example:

```
...
X=A+B;
Call Routine3(X,Y,Z);
Limit=Z;
Limit1=Z+1;      ←target statement
...
```

In path marking, only the Call statement to Routine3 is marked, since that statement is on the path to the target. A program slice on the variable Limit1 would also include the statements within Routine3 that affect the value of Z that is returned by the call to Routine3. (Z, in turn, affects the value of Limit1).

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
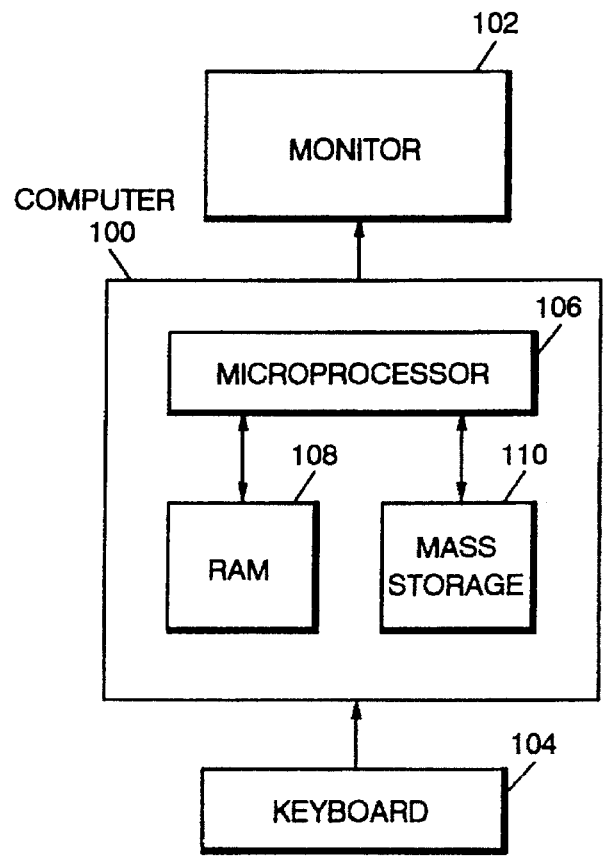
FIG. 1 shows an illustrative desktop computer configuration suitable for use of the invention.

In FIG. 1, there is shown a general block diagram of a desktop computing system containing the familiar major components of a computer 100, a monitor 102 on which results can be displayed and a keyboard via which a user can input commands and instructions to control the computer. The computer 100 contains a microprocessor 106, a random access fast memory module 108 and a mass storage device 110, which would typically be a rotating hard disk. This configuration is a typical one in which the invention to be described might be practiced, although it should be understood that this example is not limiting. Indeed, any computer configuration is satisfactory for use, such as a mainframe computer or networking configuration of servers and workstations. In the desktop environment of FIG. 1, which could be any type of desktop computer, such as an IBM PS/2 or an Apple Macintosh, a source document to be analyzed by a user might permanently reside as a document file in mass storage device 110. On command from a user, the computer reads a program file from mass storage 110 containing code for performing the process to be described herein. Thereafter, the user instructs the program to load a source code document file, also stored in mass storage 110, into RAM 108 for display to the user via monitor 102. The source program also is parsed into a source statement table, to be described fully below. The user selects a target statement of the source code document in any of a number of ways, such as typing a line number and offset, or highlighting the desired statement and pressing the ENTER key on the keyboard. In response, the process described herein locates the selected statement in the source statement table and determines from the source statement table all other source statement table entries that lie in the logic path of the target statement. All statements in the statement table are marked accordingly as True, False or Undefined. Thereafter, the results of this path marking are displayed to the user in a number of ways designed to eliminate all but the most essential information necessary to aid the understanding of how the target statement can be reached in the code.

It should be understood that a source code document may have more than one code statement per line. Once a user specifies a source code document to be analyzed, that document is parsed into a source statement table before proceeding with any other function. Each entry of the statement table represents a statement, rather than a line of the source document. In other words, a single source line containing several statements will be transformed into multiple entries of the statement table. Eventually, when path results are displayed to a user, they are displayed with respect to the source code document, not the statement table, to give the user the most relevant feedback for his or her understanding of the original source code. However, this is a preferred choice and should not be taken as limiting. For example, a display in which multiple statements of a source document line are displayed as individual lines would still be considered as being within the spirit and scope of the invention.

Figure 2:
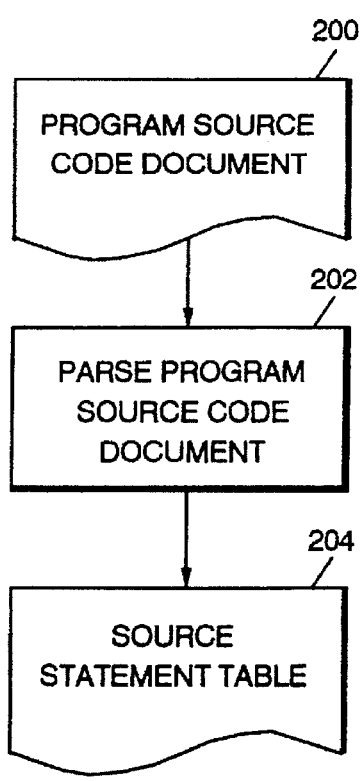
FIG. 2 shows a general block diagram of a process for generating a source code statement table from a source code document, which table is then used by the invention to display program flow paths through the source code in accordance with target statements selected by a user.

The parsing process is conceptually illustrated in FIG. 2 as taking a source code document (200), passing it through a parser (202) and producing a source statement table (204). Parsers are well known to skilled art workers and a detailed discussion of the internal workings of such a parser is not necessary. Rather, a detailed discussion of the resulting source statement table should suffice for the skilled art worker. The following routine in Table 1, which is written in C language code, will be used as an example of a source code document. The line numbers are for convenience in reading and would not ordinarily be part of the document.

TABLE 1

| LINE# | SOURCE TEXT |
|---|---|
| 1 | int TEST () { |
| 2 | |
| 3 | if (LIMIT>100) { |
| 4 | B=Y; |
| 5 | A=Z; |
| 6 | |
| 7 | if (B>C) SUB1(); |
| 8 | else SUB2(); |
| 9 | |
| 10 | if (A>=B+C) X=1; |
| 11 | else X=2; |
| 12 | } |
| 13 | else X=3; |
| 14 | |
| 15 | printf ("The value of X is %i",X); |
| 16 | } |

Parsing step 202 results in the source statement table shown below in Table 2.

TABLE 2

SOURCE STATEMENT TABLE

| LINE # | MARK | RTNID | TYPE | FROMLOC | TOLOC | NESTING |
|---|---|---|---|---|---|---|
| 1 | | 001 | P001 | 00001:00 | 00001:11 | |
| 2 | | 001 | +001 | 00003:03 | 00003:16 | +001 |
| 3 | | 001 | (001 | 00003:18 | 00003:18 | +001 |
| 4 | | 001 | =001 | 00004:06 | 00004:08 | +001 |
| 5 | | 001 | =002 | 00005:06 | 00005:08 | +001 |
| 6 | | 001 | +002 | 00007:06 | 00007:13 | +002 +001 |
| 7 | | 001 | >005 | 00007:15 | 00007:23 | +002 +001 |
| 8 | | 001 | −002 | 00008:10 | 00008:13 | −002 +001 |
| 9 | | 001 | >006 | 00008:15 | 00008:23 | −002 +001 |
| 10 | | 001 | +003 | 00010:06 | 00010:16 | +003 +001 |
| 11 | | 001 | =003 | 00010:18 | 00010:29 | +003 +001 |
| 12 | | 001 | −003 | 00011:13 | 00011:16 | −003 +001 |
| 13 | | 001 | =004 | 00011:18 | 00011:20 | −003 +001 |
| 14 | | 001 | )001 | 00012:03 | 00012:03 | +001 |
| 15 | | 001 | −001 | 00013:03 | 00013:06 | −001 |
| 16 | | 001 | =005 | 00013:08 | 00013:10 | −001 |
| 17 | | 001 | >008 | 00015:03 | 00015:34 | |
| 18 | | 001 | E001 | 00016:00 | 00016:00 | |

The LINE# field of the statement Table 2 is not present in the actual Table and is shown here only for ease in discussing specific entries of the Table. The MARK field is not used by the parser and is filled in later by the path marking logic as discussed below.

With respect to the parser, the source statement Table 2 is derived as follows. The field RTNID (Routine ID) is a unique arbitrarily assigned identifier for each routine of the source code document. In the preferred embodiment, RTNID is a sequentially assigned number. The example of Table 1 represents only one routine; since all of the statements of the example are in this routine, RTNID is the same value for all entries in the statement Table 2. A statement TYPE parameter is predefined for each possible statement type. Table 3 below defines each of the statement types defined for this embodiment of the invention.

TABLE 3

STATEMENT TYPES

| | |
|---|---|
| + | IF STATEMENT |
| − | ELSE STATEMENT |
| ( | DO STATEMENT |
| ) | END STATEMENT |
| ⁻( | DO LOOP STATEMENT |
| ⁻) | END LOOP STATEMENT |
| = | ASSIGNMENT STATEMENT |
| > | CALL STATEMENT |
| P | BEGINNING OF PROCEDURE OR ROUTINE |
| E | END OF PROCEDURE OR ROUTINE |
| ! | RETURN, EXIT OR GOTO |
| ; | NOP (NO OPERATION) |
| . | LEAVE OR BREAK |
| " | ITERATE OR CONTINUE |

The TYPE field of the statement Table 2 begins with a statement type parameter from Table 3. This field is discussed below in more detail below. For now, let's digress slightly into a discussion of statement types.

Table 3 contains a sufficient collection of statement types to represent any source program. However, in doing so, it becomes necessary sometimes to translate a source statement construction into a different collection of the types from Table 3. For example, many languages, including the C language, support a CASE type of statement. In C, this is called a 'switch' construct. Some languages also support a number of variations of 'do' loops. It can be shown that these and other conditional constructs can be represented by a transformation into 'if statement' constructs, which are defined in Table 3. For example, consider the C language 'switch' construct, which has a syntax of

```
switch (expression) {
    case 1: statement1; break;
    case 2: statement2; break;
    default: statement3 }
```

A parser encountering this construct when building a source statement Table 2 would transform the 'switch' construct into the following before parsing:

```
{if (expression=1) statement1; else if (expression=2) statement2;
    else statement3}
```

Similarly, a 'do while' variation of the form while (expression) statement;
would be transformed into the following pseudo-construct

```
do forever
    if not expression then leave
    statement
enddo
```

No more examples of transformations appear to be necessary. Given these simple examples, any skilled art worker should be able to determine how to transform any construct into the primitive types listed in Table 3.

As shown in statement Table 2, the TYPE field of each entry also contains a number appended to the type parameter from Table 3. Thus, for example, the TYPE field of line 1 of the statement Table 2 contains P001. The 'P' is the parameter type for a beginning of procedure or routine statement. In the example of Table 1, this corresponds to the '{' character of line 1. The number appended to each parameter type of the TYPE field is sequentially assigned and unique within each parameter type. Thus, the first statement of type '+' is assigned the number 001 to result in a TYPE of +001, the second of type '+' is assigned the number 002 to result in a TYPE of +002, the first of parameter type—is assigned the number 001 to result in a TYPE of −001, and so on. The TYPE P001 in line 1 of the statement Table thus represents that this is the first beginning of routine statement encountered in parsing the source document.

The FROMLOC and TOLOC fields both have the format LINE#:OFFSET. When the beginning of a statement is encountered in a line of the source code document, that line number and its offset from the beginning of the line is entered into the FROMLOC field of the statement Table 2. Similarly, the source document line number and offset of the last character of the line that ends the statement is entered into the TOLOC field of the statement Table. The values in these fields are used, among other things, to locate a target statement selected from the source document in the statement Table. The actual numbers used in the OFFSET portion of FROMLOC and TOLOC in Table 2 are illustrative, and other tables may not correspond correctly with the actual character counts shown in the Tables.

Finally, the statement Table 2 contains a NESTING field. This field is actually an expanding list of nesting entries for each statement entry as needed to identify the nesting level of each statement. For example, in line 2 of statement Table 2, one nesting entry '+001' identifies the nesting level of the first 'IF' statement encountered in the source document at its source line 3 line. The '+001' refers to a value in the TYPE field for identifying the statement Table entry that initiated the nesting entry. The fact that it is the fight most entry in the nesting list means that this 'IF' statement starts a first level of nesting. Similarly, the 'IF' statement of source document line 7 in Table 1 causes a second level of nesting to be entered at line 6 of the statement Table 2. As seen, the nesting list is entered from right to left in the statement Table NESTING field.

For the convenience of the reader, a variation of statement Table 2 is now shown in Table 4 in which each entry is associated with the beginning character in the source document that caused the statement entry. This Table does not exist in the actual implementation. It is shown here only as an aid to comprehension.

the user selects a target state, say, by highlighting it with a mouse and pressing ENTER. By way of example, it is assumed that the user selects the source statement (X=2) in line 11 of Table 1 as the target statement. As a result of that selection, the line and offset of the selected source statement in the source document is stored in variable TGTSTMT (not shown). The path marking process begins at START in FIG. 3. Step 300 initializes a CALLLIST table (not shown) to null to prepare it for later adding entries relating to calls in other routines of the program that call the target routine. A loop is begun at step 302 to locate the target statement that has been selected by the user. Step 304 ends the loop and if the target statement has not been found in the statement Table, an error message is returned at step 305. As part of the loop, step 306 reads the next entry of the statement table; step 308 com-

TABLE 4

VARIATION OF SOURCE STATEMENT TABLE

| LINE# | MARK | RTNID | TYPE | FROMLOC | TOLOC | NESTING | |
|---|---|---|---|---|---|---|---|
| 1 | | 001 | P001 | 00001:00 | 00001:11 | | { |
| 2 | | 001 | +001 | 00003:03 | 00003:16 | +001 | IF |
| 3 | | 001 | (001 | 00003:18 | 00003:18 | +001 | { |
| 4 | | 001 | =001 | 00004:06 | 00004:08 | +001 | = |
| 5 | | 001 | =002 | 00005:06 | 00005:08 | +001 | = |
| 6 | | 001 | +002 | 00007:06 | 00007:13 | +002 +001 | IF |
| 7 | | 001 | >005 | 00007:15 | 00007:23 | +002 +001 | Call SUB1 |
| 8 | | 001 | −002 | 00008:10 | 00008:13 | −002 +001 | ELSE |
| 9 | | 001 | >006 | 00008:15 | 00008:23 | −002 +001 | Call SUB2 |
| 10 | | 001 | +003 | 00010:06 | 00010:16 | +003 +001 | IF |
| 11 | | 001 | =003 | 00010:18 | 00010:29 | +003 +001 | = |
| 12 | | 001 | −003 | 00011:13 | 00011:16 | −003 +001 | ELSE |
| 13 | | 001 | =004 | 00011:18 | 00011:20 | −003 +001 | = |
| 14 | | 001 | )001 | 00012:03 | 00012:03 | +001 | } |
| 15 | | 001 | −001 | 00013:03 | 00013:06 | −001 | ELSE |
| 16 | | 001 | =005 | 00013:08 | 00013:10 | −001 | = |
| 17 | | 001 | >008 | 00015:03 | 00015:34 | | PRINTF |
| 18 | | 001 | E001 | 00016:00 | 00016:00 | | } |

The implementation to be described also uses a number of variables referenced in the flowcharts. TGT_LINE_OFFSET is set to the value of the beginning of the line and offset of a target source statement selected by a user. One a target statement is located in the statement Table 2, TGT_RTNID is set to the value contained in field RTNID of the statement Table. TGTLIST is set to the list of nesting logic entries for the target statement in field NESTING of the statement Table 2. CURRMARK is set at an appropriate place in the processing of each statement Table entry to the value of the field MARK from that statement Table entry. STMTLIST is set to the list of nesting logic entries for the statement Table entry being processed. TOKEN is set to the value of a nesting entry being processed in STMTLIST. TKNNUM is set to the numeric portion of TOKEN. For example, with respect to line 2 of statement Table 2, when the nesting entries are being processed, TKNNUM is set to the value 001 from the nesting entry +001 when that nesting entry is being processed. Finally, CALLLIST is built to contain a list of statement Table entries for call statements to the routine (the target routine) that contains the target statement.

Figure 3:
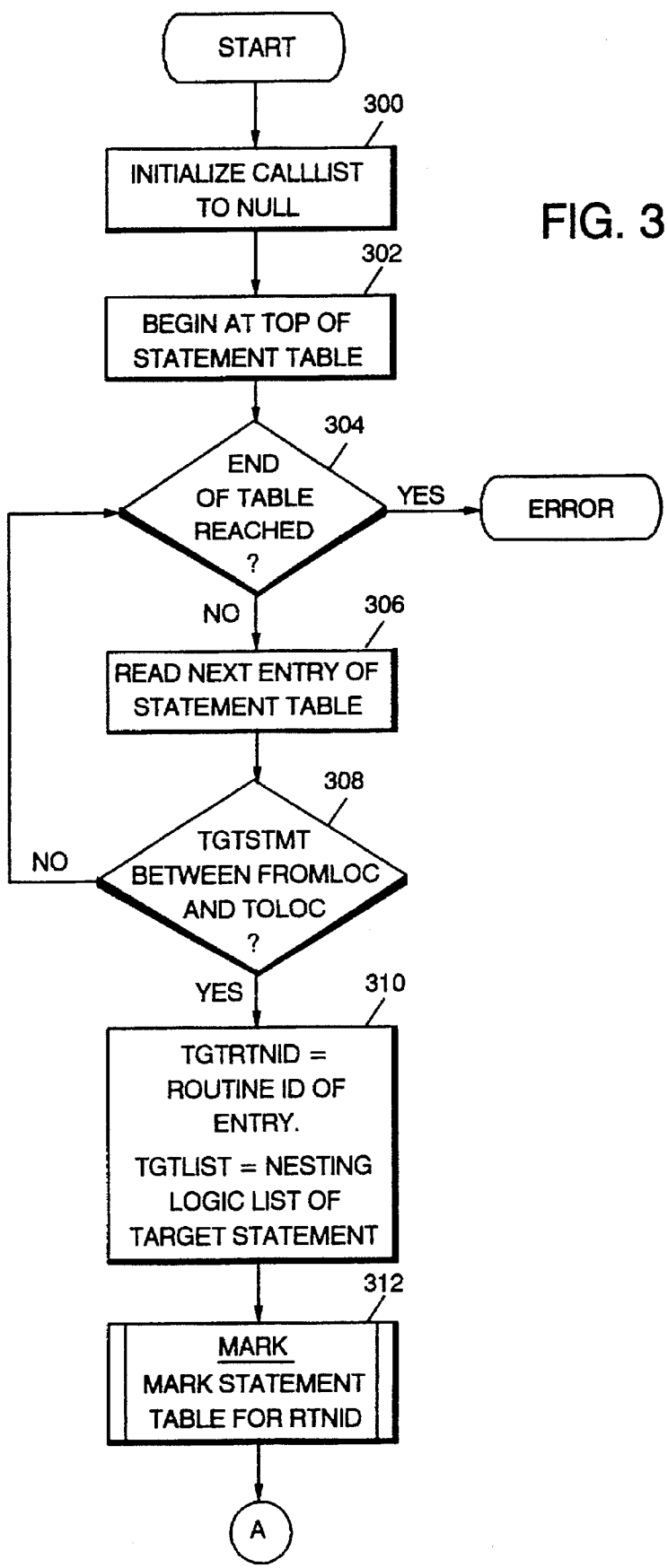
FIGS. 3 and 4, taken together, show a flowchart of an illustrative software process for marking statements in the source code statement table of a software routine or procedure that contains a target statement as to whether or not the statements of the routine or procedure belong in the flow path of the target statement.

With the above as background, attention is now directed to the flowcharts beginning with the flowchart in FIG. 3. We use the example of Table 1 as the source code document that is to be analyzed. It is assumed that the parsing step illustrated at 202 of FIG. 2 has already be performed and the user is ready to analyze the routine by path marking. The source code document is displayed on the monitor 102 and pares the value stored in variable TGTSTMT to the values in FROMLOC and TOLOC of the statement table to determine if this is the statement table entry relating to the selected source document statement. Steps 304, 306 and 308 continue to loop through the statement table until the target statement is located, at which time step 310 stores the routine identification from RTNID of the statement table in variable TGTRTNID. Next step 312 calls subroutine MARK to mark all entries of the statement table as to whether they lie on the path to the target statement or not.

Figure 4:
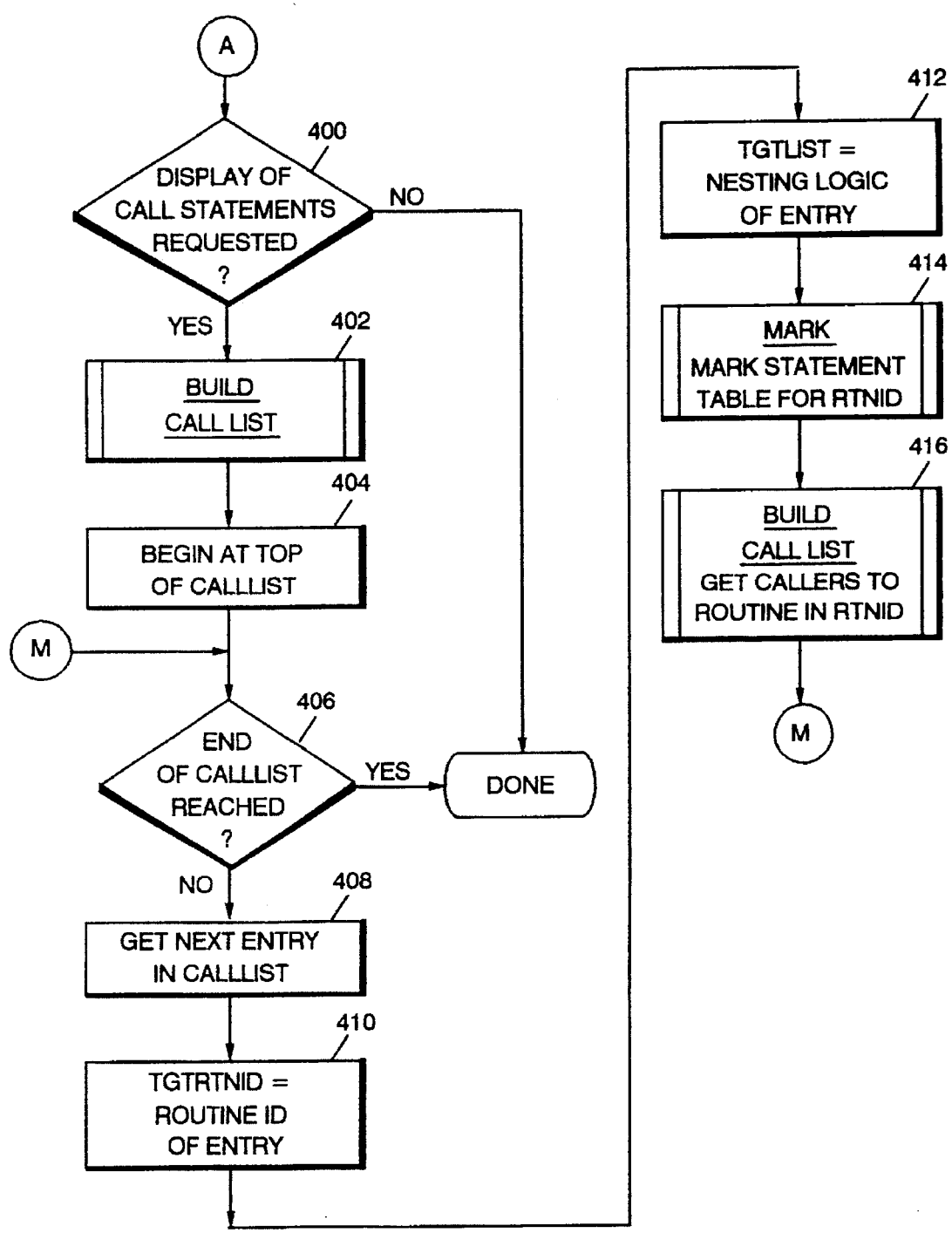
Figure 5:
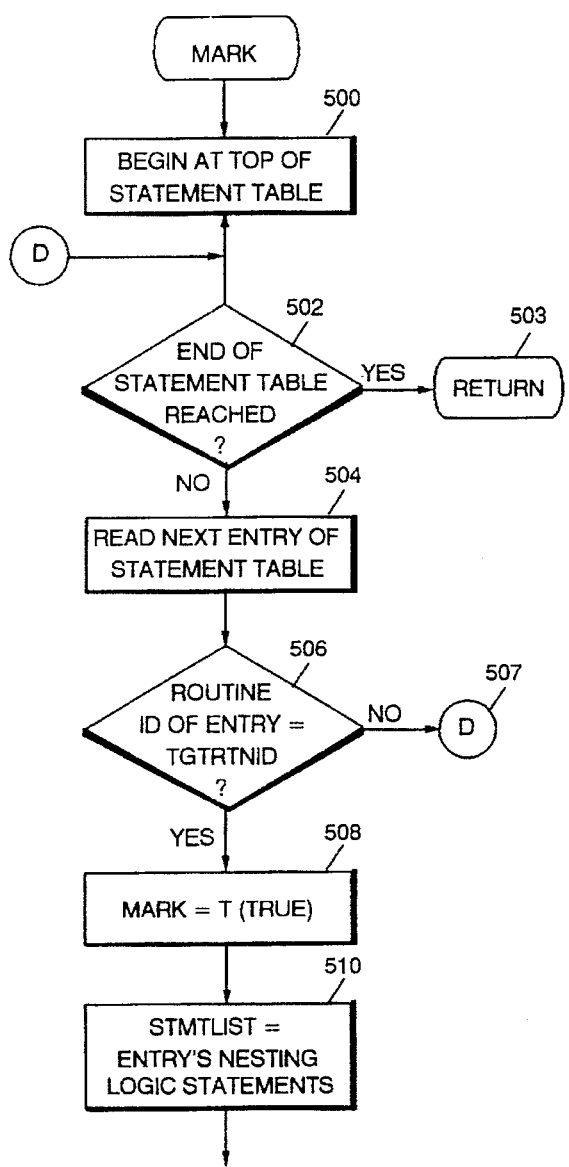
FIG. 5 shows an illustrative subroutine used by the process of FIGS. 2 and 3 to mark each statement of the source statement table with an appropriate legend according to whether the statements are in the target statement path, outside of the path or undefined with respect to the path.
Figure 5:
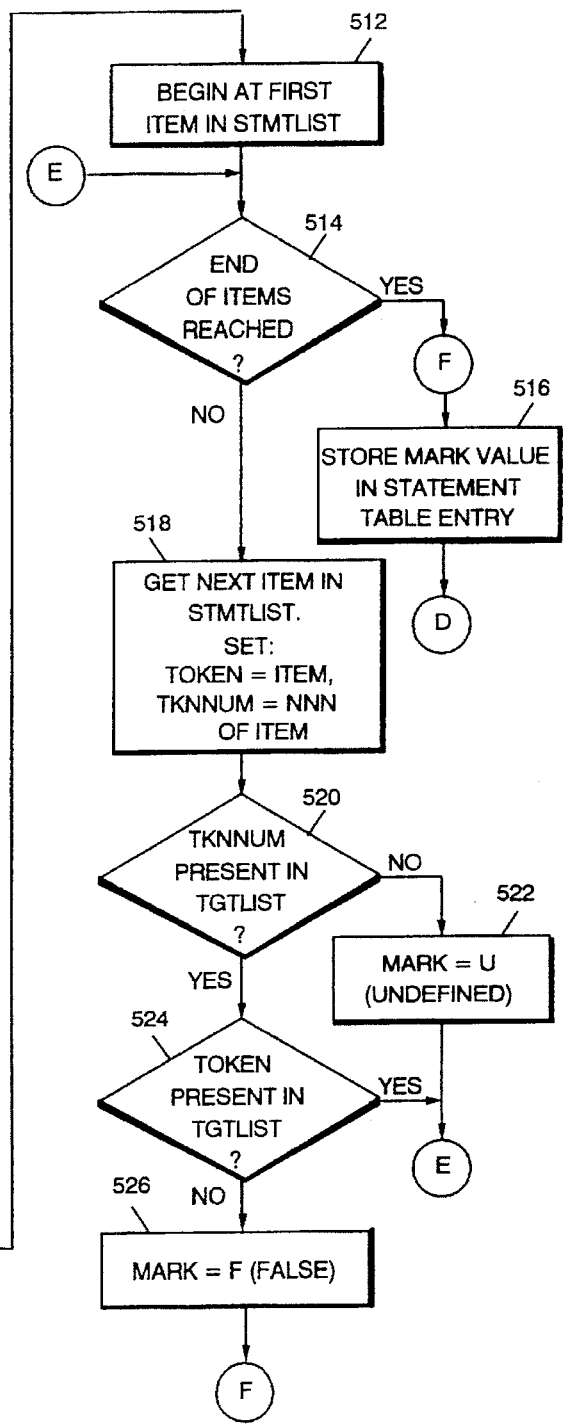

Subroutine MARK is shown in FIG. 5. A loop is begun at step 500 to process all entries of the statement table. Return is made to the calling routine by steps 502 and 503 when the loop is completed. Step 504 gets the next statement table entry to be marked. Step 506 determines if the statement being processed is in the same routine as the target statement. This is accomplished by comparing the values of RTNID and TGTRTNID. If the routines are different, step 506 continues to loop to the next statement table at label D (507). If the routines are the same, step 508 sets the field MARK in the statement table to T (True) as a default value. Later steps may change this value for this entry if necessary. Step 510 now saves this entry's nesting list from the NESTING field in variable STMTLIST. Step 512 begins a loop through each of the nesting items now in STMTLIST. The output of this process determines whether or not this statement table entry is actually on the path of the target statement. Step 518 fetches the next item in STMTLIST and sets variable TOKEN to the item value. For example, if the statement being processed is at line 6 of statement Table 2, the first item of STMTLIST IS +001, which is stored in TOKEN. Step 518 also sets variable TKNNUM to the numeric value of the item (the 001 portion of item). Step 520 now searches the nesting logic list of the target statement (which is present in variable TGTLIST) to determine if the value in variable TKNNUM is present on this nesting list. If TKNNUM is not present in the nesting list of the target statement, then it cannot be determined if this particular statement table entry being processed is in the logic path of the target path or not. This situation occurs for example where there are two or more paths to the target statement, one of which will be taken in a specific instance, but it cannot be determined for marking purposes which one it will be. In this event, step 524 sets MARK for the entry being processed to U (Undefined). If TKNNUM is contained in TGTLIST, and if TOKEN is also present in TGTLIST (as determined at step 524), the statement now being processed is determined to be in the target statement path. In this event, step 524 continues the loop through the STMTLIST, because MARK is already set to T (True). If at step 524, TOKEN is not found in the TGTLIST, the statement being process does not reside in the target path and step 526 sets MARK to F (False) to reflect this conclusion. In any event, step 516 at label F now stores whatever value is in variable MARK into field MARK for the entry in the statement table and the loop through the statement is continued at step 502 with the next entry. When all statements in the statement table have been marked in the manner described, return is made to the calling routine at 503. In the present instance, this return is to label A in FIG. 3 and thence on to A in FIG. 4.

In FIG. 4, step 400 first determines if the user has requested that all calls to the routine containing the target statement also be determined for eventual display. This determination is optional. The following steps may always be performed or not, if desired. If the answer is no at step 400, all marking is complete and exit is made at DONE to await further instructions from the user. If the answer is yes, step 402 call subroutine BUILD_CALL_LIST to build a list of all other routines that make calls to the target routine containing the target statement.

Figure 6:
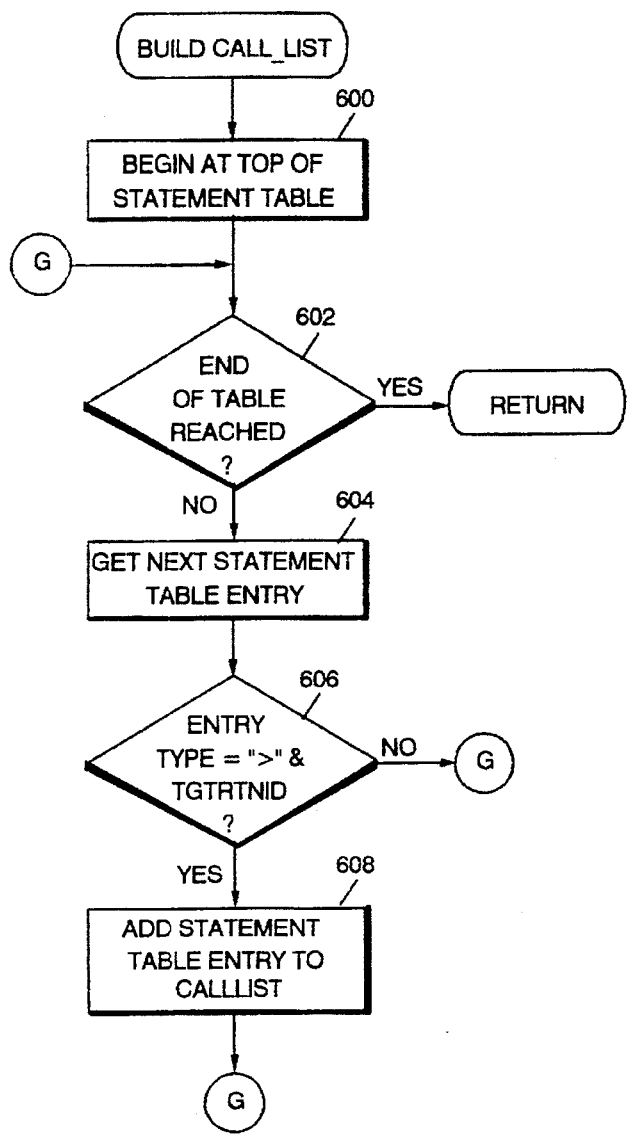
FIG. 6 shows an illustrative flowchart of a subroutine used by the process of FIGS. 2 and 3 to build a list of other routines that perform calls to the routine containing the target statement.

BUILD_CALL_LIST is shown in FIG. 6. Step 600 initiates another loop through the statement table to locate calls to the target routine. When the loop is completed, return is made at step 602 back to step 402. During the loop, step 604 fetches the next statement table entry to be processed; step 606 determines if the entry type in field TYPE of this entry is ">" (a call statement) to the target routine identified in variable TGTRTNID. If so, this entire statement table entry is added to the list in CALLLIST and the loop is continued at G until the entire statement table is processed at which return is made to FIG. 4.

Returning to FIG. 4, when step 404 is reached, CALLLIST is completely built and contains all statement table entries that directly perform calls to the target routine. Step 404 initiates a loop through all of the CALLLIST entries. For each CALLLIST entry being processed (step 408), step 410 sets variable TGTRTNID to the value of RTNID of the CALLLIST entry being processed and step 412 sets TGTLIST to the list of nesting items from NESTING of the CALLLIST entry. Step 414 then calls subroutine MARK to mark all entries of TGTLIST as to whether they are True, False or Undefined with respect to being in the path of the target statement.

Once direct calls to the target routine are processed as described immediately above, then calls to those routines that directly call the target routine must be processed, and so on until the hierarchy of calls to routines that eventually lead to the target routine are exhausted. At that point all possible paths to the target routine will have been identified and processed. This is the purpose of step 416 which adds to CALLLIST those statement table entries that, on this pass, directly call the target routine. When this completed, the loop that begins at step 406 is initiated again to process all the present entries in CALLLIST. This process is repeated until there are no more calls to routines that eventually lead to the target routine.

At this point, the source table is completely path marked with respect to the target statement and it remains to display the results in a meaningful manner and in accordance with the invention to assist the user with program flow understanding. It is recalled that preferably, any display of actual source code statements to the user should be in the same format as the original source code document. That is, if an original source document line contains multiple statements, at least one of which is in the path of the target statement, then the original line containing the multiple statements should be displayed. Highlighting, different colors or any other method of distinguishing portions of text on a monitor may be used if desired to indicate those parts of a line that are True, False or Undefined with respect to the target statement path. This conversion of the marked results in the statement table to the format of the original source document is the purpose of the program beginning in FIG. 7

Figure 7:
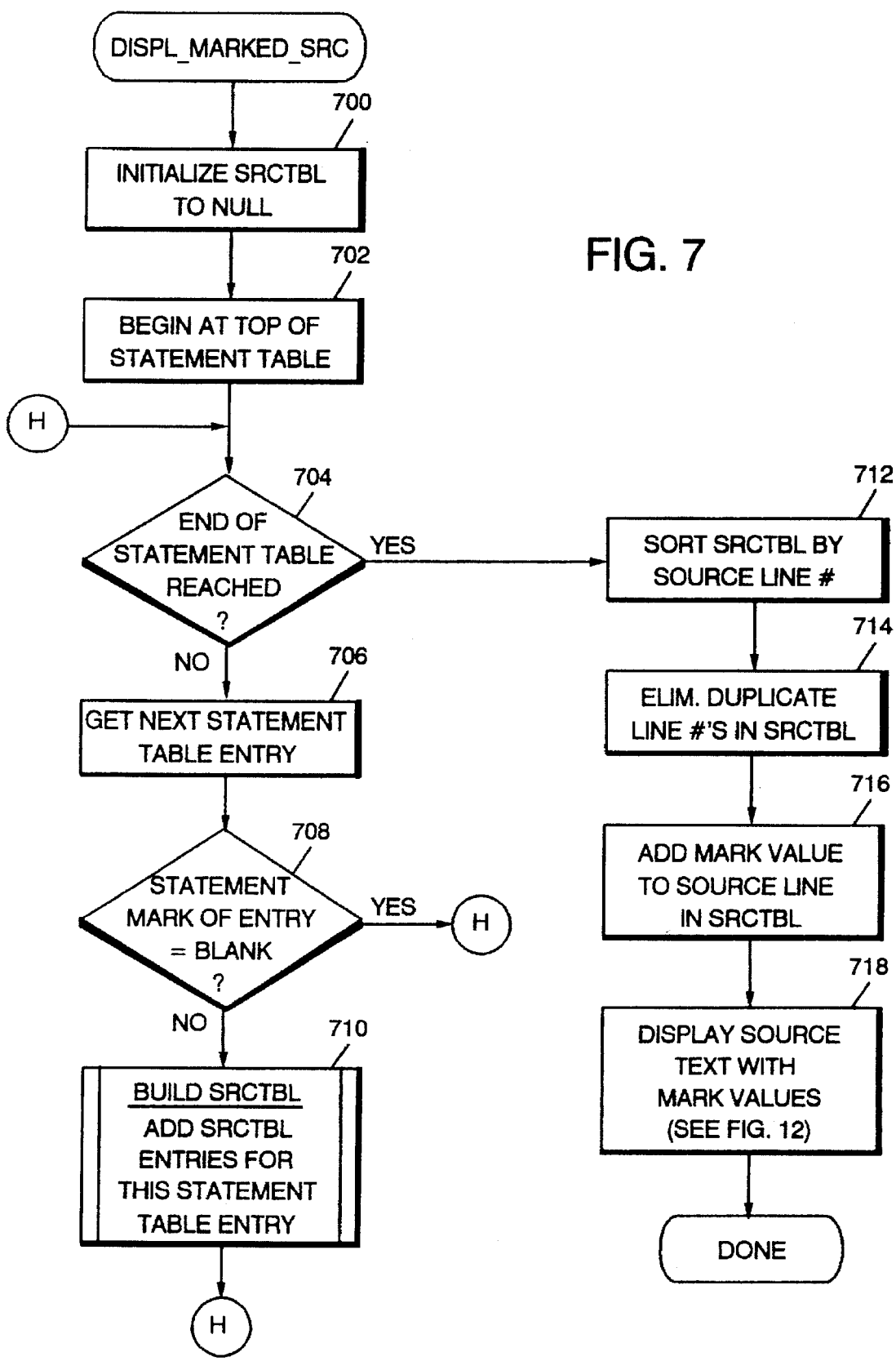
FIG. 7 shows an illustrative flowchart for displaying the results of the path marking process of the earlier figs. with respect to the original source document from which the source table is generated.
Figures 11, 12, 13:
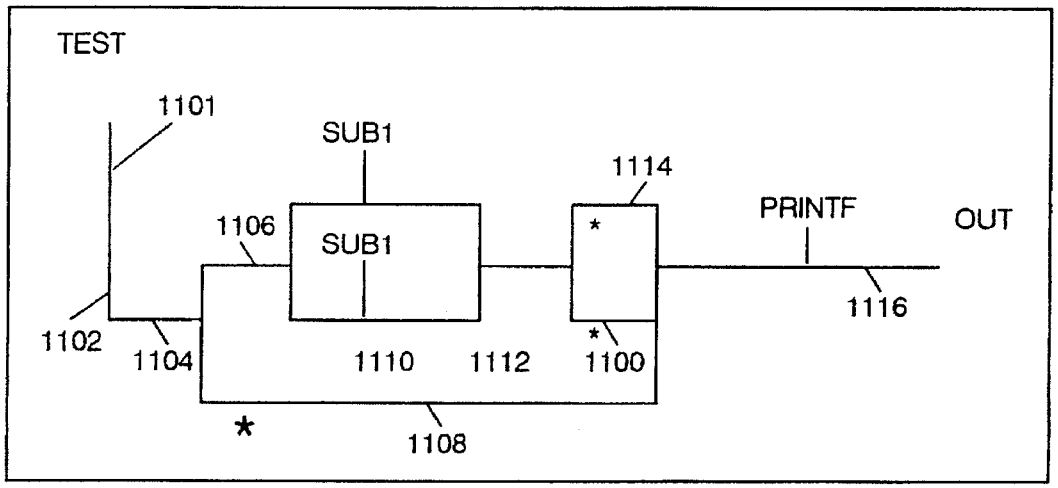
FIG. 11 shows an illustrative simplified path flow diagram of a sample routine used herein for illustration.
FIG. 12 shows an illustrative display of the source code document of the example routine used herein, with each line of the original source document, as opposed to statement, marked as to whether or not a statement on the line lies on the path of a target statement.
FIG. 13 shows an elided version of a display of the original source code document containing only the minimal conditional tests that need to be satisfied for the target statement to be executed.

The program DISPL_MARKED_SRC in FIG. 7 takes the original source code document (200 in FIG. 2) and the marked source code table (STMTTBL) and produces a display of source code text with the mark values (see FIG. 12). One problem with marking source code text is that a line of source text may contain more than one program statement and these several statements may have different path marks. One possible way to handle this case is to use the path mark for the first statement appearing on the source line. This is just one possible choice for display and should not be taken as limiting.

The implementation of DISPL_MARKED_SRC also uses additional variables referenced in the flowcharts. SRCTBL is a table consisting of the MARK value for a program statement and the source text line number for that statement. If the statement spans more than one line, two or more entries will be present in SRCTBL, one for each line number that contains a portion of the statement. The statement's MARK value will be repeated in each of these entries in SRCTBL.

The process of displaying the marked source code text begins at DISPL_MARKED_SRC in FIG. 7. Step 700 initializes the SRCTBL to null to prepare it for later adding entries for statements as they are processed. A loop is begun at step 702 to process each entry of the marked statement table, STMTTBL. Step 704 ends the loop when the end of STMTTBL has been reached. As part of the loop, step 706 reads the next entry of STMTTBL; step 708 compares the MARK value for the entry to blank. If the MARK value is blank, step 708 continues to loop to the next STMTTBL entry at label H (step 704). If the MARK value is not blank, step 710 calls subroutine BUILD_SRCTBL (see FIG. 8) to add entries to SRCTBL for the current entry of STMTTBL. Step 710 then continues to loop to the next STMTTBL entry at label H (step 704).

When the end of STMTTBL is reached in step 704, all statements have been processed and entries have been added to SRCTBL for all statements with a MARK value not blank. Step 712 then sorts the SRCTBL entries in ascending order by source LINE#. The sort process must preserve the original order of SRCTBL entries for entries which have the same LINE# value, so that the first MARK value for a given LINE# will be the MARK value of the first statement which appears on that source line. Step 714 eliminates duplicate adjacent entries in SRCTBL which have the same LINE# value. In eliminating duplicates, the first entry in the table is taken and subsequent entries with the same LINE# value are removed, so that the remaining MARK value for that source line will be the MARK value of the first statement on that source line.

Step 716 then adds the MARK values for each source line to the source text, by reading the source code text line for each entry in SRCTBL and adding the MARK value from SRCTBL to that line. The resulting marked source code text is then displayed in step 718, as depicted in FIG. 12.

Figure 8:
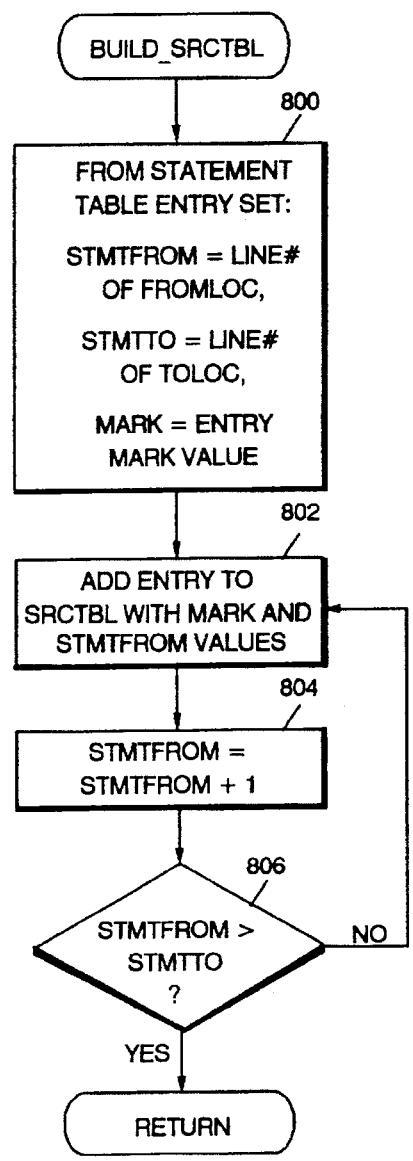
FIG. 8 shows an illustrative flowchart of a subroutine used by the process of FIG. 7 to add entries to a table of source code line numbers.

Subroutine BUILD_SRCTBL is shown in FIG. 8. Several variables are used in this subroutine. STMTFROM is a field which is used to store the LINE# portion of the FROMLOC value for a statement and STMTTO is a field used to store the LINE# portion of the TOLOC value for a statement. MARK is a field used to store the MARK value for a statement. Step 800 takes the current STMTTBL entry and sets the STMTFROM and STMTTO fields to the LINE# portion of the entry's LOCFROM and LOCTO values, respectively, and the MARK field to the entry's MARK value. A loop is begun at step 802 in which an entry is added to SRCTBL from the LOCFROM and MARK values. As part of the loop, step 804 adds 1 to STMTFROM and step 806 tests whether STMTFROM is now greater than the STMTTO value. If STMTFROM is not yet greater than STMTTO, step 806 continues to loop to add another entry to SRCTBL at step 802. If STMTFROM is greater than STMTTO, the process of building SRCTBL entries from the STMTTBL entry is complete and BUILD_SRCTBL returns.

Alternate methods of display may be used to display the results of the path marked statement table in a meaningful manner and in accordance with the invention to assist the user with program flow understanding. One method is to show only those minimal conditional tests that need to be satisfied to cause the target statement to be executed. Such a display includes the target statement itself and all conditional statements (IF or ELSE statements) that have been previously marked T (true). In addition, all statements that have a grouping function (DO, END, LOOP DO, LOOP END, PROCEDURE BEGIN and PROCEDURE END) that have been marked T (true) are included so that the context of the target and conditional statements can be understood. All other statements in the source program are elided with some meaningful elision notation, for example, a series of dashes. The conversion of the marked results in the statement table to a display of the minimal conditional statements in the source code text is the purpose of the program beginning in FIG. 9.

Figure 9:
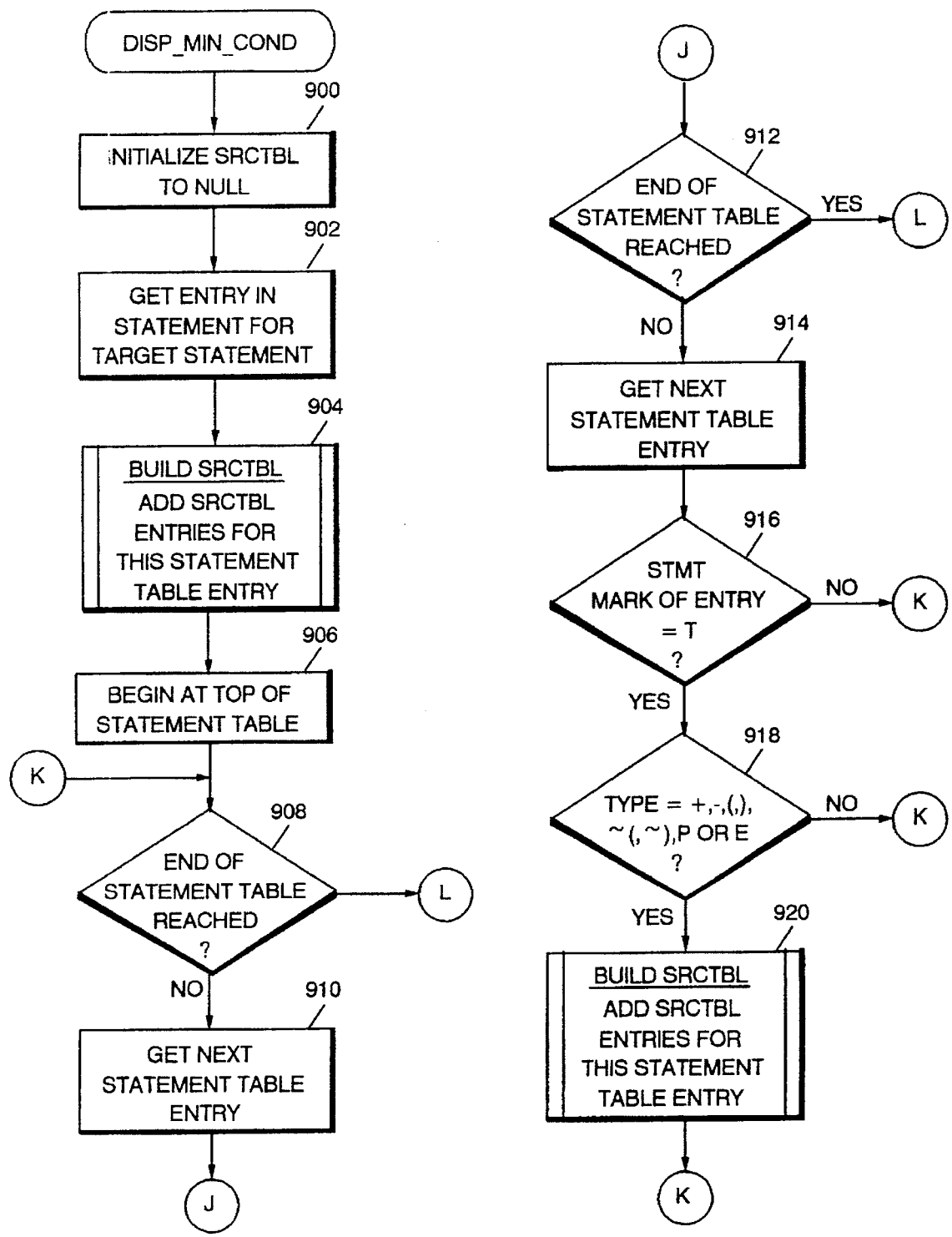
FIGS. 9 and 10, taken together, show an illustrative flowchart for displaying results of the path marking process in the form of an elided version of the source document.
Figure 10:
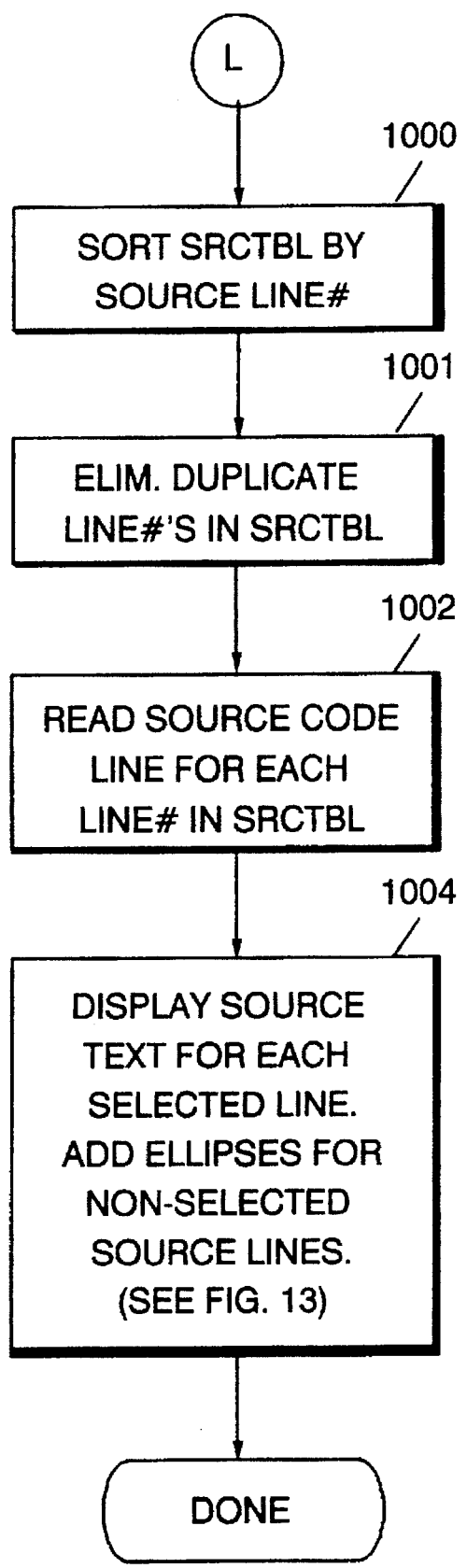

The program DISPL_MIN_COND in FIG. 9 and 10 takes the original source code document (200 in FIG. 2) and the marked source code table (STMTTBL) and produces a display of source code text with all source text lines elided except those which contain the target statement and conditional and grouping statements which were previously marked T (see FIG. 13).

The implementation of DISPL_MIN_COND also uses variables referenced in the flowcharts. SRCTBL is a table consisting of the MARK value for a program statement and the source text line number for that statement. If the statement spans more than one line, two or more entries will be present in SRCTBL, one for each line number that contains a portion of the statement. The statement's MARK value will be repeated in each of these entries in SRCTBL.

The process of displaying the minimal conditional source statements begins at DISPL_MIN_COND in FIG. 9. Step 900 initializes the SRCTBL to null to prepare it for later adding entries for statements as they are processed. Step 902 locates the entry in STMTTBL for the target statement, in order to add this statement to SRCTBL so that it will be included in the display. Step 904 calls subroutine BUILD_SRCTBL (FIG. 8) to add entries to SRCTBL for the target statement.

A loop is begun at step 906 to process each entry of the marked statement table, STMTTBL. Step 908 ends the loop when the end of STMTTBL has been reached. As part of the loop, step 910 reads the next entry of STMTTBL; step 916 compares the MARK value for the entry to T. If the MARK value is not T, step 916 continues to loop to the next STMTTBL entry at label K (step 908). If the MARK value is T, step 918 further tests whether the entry's TYPE value is one of the following values: +, −, (,), ~(,~), P or E. If it is not one of these statement types, step 918 continues to loop to the next STMTTBL entry at label K (step 908). If the TYPE is one of the list, step 920 calls subroutine BUILD_SRCTBL (FIG. 8) to add entries to SRCTBL for the current entry of STMTTBL. Step 920 then continues to loop to the next STMTTBL entry at label K (step 908).

When the end of STMTTBL is reached in step 908, all statements have been processed and entries have been added to SRCTBL for the target statement and all statements that are marked T and are of the prescribed statement TYPE. Step 908 then proceeds to step 1000 (FIG. 10), which sorts the SRCTBL entries in ascending order by source LINE#.

Step 1001 eliminates duplicate adjacent entries in SRCTBL which have the same LINE# value. Step 1002 then reads the source code text line for each entry in SRCTBL. Source lines that are not included in SRCTBL are represented by an elision line. The resulting elided source code text is then displayed in step 1004, as depicted in FIG. 13.

FIG. 11 shows an illustrative example of a simplified path diagram generated in accordance with one feature of the invention, assuming that the user initially selected line 11 (X=2) as the target statement in the original source document shown in Table 1. The image of FIG. 11 would, for example, be displayed on the monitor of a workstation in an interactive manner on request by the user. This particular example assumes that the entire source document that was parsed and marked as described above consisted entirely of the routine TEST shown in Table 1. The name of the routine (TEST) is displayed in the upper left corner of the image. a line 11 represents a flow path or direct connection to the main body of the flow path image. The bold lines of the image represent the path through TEST that have been determined to be in the path leading to the target statement X+2. In particular, the bold line segment beginning at 1102 represents the beginning brace in line 1 of Table 1. The end of this segment at 1104 represents the IF branch condition at line 3 of Table 1. Since this is a branch point in the flow, two possible paths 1106 and 1108 are shown in the image. The path 1106, which represents lines 4 and 5 in Table 1 are in bold because these statements have been determined by the path marking logic to reside in the path to statement X+2. No logic path is in bold extending from the branch point 1110, which represents the IF statement at line 7 of Table 1, because the particular branch taken at this point depends on the respective values of variable B and C in the source code. Since nothing is known regarding these values, these statements are marked as U (Undefined) in the statement table and displayed in normal line weight in the image diagram. Whichever of these two paths is taken in this example, both paths converge again at line 10 of Table 1; this is represented by the bold line segment at 1112. The IF statement at this line 10 is represented by the branch paths at 1114. For this particular branch, the bottom path 1100 represents the target statement and is thus shown in bold. Both of these branch paths at 1114 and the path 1108 from the first branch at 1104 also converge at the PRINTF statement in line 15 of Table 1. The line segment 1116 represents the PRINTF and because it is also in the path (the trailing path) of the target statement, this line is also shown in bold.

The above simplified flow path line drawing has proven to be quite useful as an aid to simplifying and organizing program flow for the edification of users. Numerous variations of this type of display, including the content of what can be displayed in any particular embodiment, should present themselves to the reader. For example, had the example code discussed herein included other routines that called routine TEST, and even other routines that called those routines, then it would be informative to also display, say boxes representing those routines, along with text identifying their names and lines connecting the boxes according to the determination of which routines called which in the path to the target statement.

FIG. 12 shows an example of a simplified display of the original source code for the example under discussion. This is a minimally elided display in which blank lines have been removed, and all remaining lines are marked with a T, F or U according to the path marking logic discussed above. A further elision of FIG. 12 might be the removal from the display of those lines that are marked as F (False).

The minimally elided display shown in FIG. 13 has proven to be the most useful of the simplified display formats. In this display all lines marked as F (False) and U (Undefined) are elided. Further, all lines that contain statements other than conditional or grouping statements (see step 918) are elided. All contiguous lines that have been elided are replaced with ellipses ( . . . ) to assist the user.

It is to be understood that the above described arrangements are merely illustrative of the application of principles of the invention and that other arrangements may be devised by workers skilled in the art without departing from the spirit and scope of the invention.

We claim:

1. A method of generating software source code path flow displays relative to a target statement of a source code document, comprising the steps of identifying the target statement, examining each statement of the source code to determine if the statement resides in the logic flow path of the target statement, does not reside in the logic flow path to the target statement, or is undefined with respect to whether or not it resides in the logic flow path to the target statement, marking each statement as to the logic flow path determination of the examining step, generating a simplified display of representations of selected statements of the source code document based on the markings of the source code statements, such that representations of statements that do not reside in the logic path of the target statement are not displayed.

2. The method of claim 1 further comprising the steps of prior to the examining step, scanning all lines of the source code to determine lines that contain multiple statements, and generating a new copy of the source code in which each statement is contained on a separate line, and the step of examining each statement further comprises the step of examining each line of the new copy of the source code.

3. The method of claim 2 wherein the step of generating a simplified display of the source code document further comprises the step of displaying statements that appear in the source code document in a multi-statement line format in the same multi-statement line format as the source code document.

4. The method of claim 1 wherein the step of generating a simplified display of the source code document further comprises the step of displaying representations of all statements that reside in the path of the target statement.

5. The method of claim 1 wherein the step of generating a simplified display of the source code document further comprises the step of displaying only a representation of the target statement and representations of conditional statements that reside in the path of the target statement.

6. The method of claim 5 further comprising the step of displaying representations of all statements in the path of the target statement that implement a statement grouping function, such as DO groups, LOOP groups and PROCEDURE groups.

7. The method of claim 1 wherein the step of generating a simplified display of the source code document further comprises the step of displaying simplified flow diagrams of all statements that reside in the path of the target statement.

8. The method of claim 7 wherein the step of generating a simplified display of the source code further comprises displaying simplified flow diagrams of all statements for which it cannot be determined if they reside in the path of the target statement or not.

9. The method of claim 7 or claim 8 wherein the step of displaying simplified flow diagrams further comprises displaying program flow as a line drawing.

10. The method of claim 9 wherein the step of displaying program flow as a line drawing further comprises the step of representing statements in the path of the target statement as lines with a first visual attribute, and representing statements for which it cannot be determined if they are in the path of the target statement or not as lines with a second visual attribute.

11. The method of claim 10 further comprising the step of annotating the lines with indicia identifying the associated statements.

12. The method of claim 10 further comprising the step of annotating some of the lines with indicia identifying associated groups of statements.

13. Apparatus for generating software source code path flow displays relative to a target statement of a source code document, comprising means for identifying the target statement, means for examining each statement of the source code to determine if the statement resides in the logic flow path of the target statement, does not reside in the logic flow path to the target statement, or is undefined with respect to whether or not it resides in the logic flow path to the target statement, means for marking each statement as to the logic flow path determination of the examining step, means for generating a simplified display of representations of selected statements of the source code document based on the markings of the source code statements, such that representations of statements that do not reside in the logic path of the target statement are not displayed.

14. The apparatus of claim 13 further comprising means for scanning all lines of the source code prior to the examining step to determine lines that contain multiple statements, and means for generating a new copy of the source code in which each statement is contained on a separate line, and wherein the means for examining each statement further comprises means for examining each line of the new copy of the source code.

15. The apparatus of claim 14 wherein the means for generating a simplified display of the source code document further comprises means for displaying statements that appear in the source code document in a multi-statement line format in the same multi-statement line format as the source code document.

16. The apparatus of claim 13 wherein the means for generating a simplified display of the source code document further comprises means for displaying representations of all statements that reside in the path of the target statement.

17. The apparatus of claim 13 wherein the means for generating a simplified display of the source code document further comprises means for displaying only a representation of the target statement and representations of conditional statements that reside in the path of the target statement.

18. The apparatus of claim 17 further comprising means for displaying representations of all statements in the path of the target statement that implement a statement grouping function, such as DO groups, LOOP groups and PROCEDURE groups.

19. The apparatus of claim 13 wherein the means for generating a simplified display of the source code document further comprises means for displaying simplified flow diagrams of all statements that reside in the path of the target statement.

20. The apparatus of claim 19 wherein the means for generating a simplified display of the source code further comprises means for displaying simplified flow diagrams of all statements for which it cannot be determined if they reside in the path of the target statement or not.

21. The apparatus of claim 19 or claim 20 wherein the means for displaying simplified flow diagrams further comprises means for displaying program flow as a line drawing.

22. The apparatus of claim 21 wherein the means for displaying program flow as a line drawing further comprises means for representing statements in the path of the target statement as lines with a first visual attribute, and means for representing statements for which it cannot be determined if they are in the path of the target statement or not as lines with a second visual attribute.

23. The apparatus of claim 22 further comprising means for annotating the lines with indicia identifying the associated statements.

24. The apparatus of claim 22 further comprising means for annotating some of the lines with indicia identifying associated groups of statements.

25. A program storage device readable by a machine, tangibly embodying program instructions executable by the machine to perform method steps for generating software source code path flow displays relative to a target statement of a source code document, said method when executed by the machine comprising the steps of identifying the target statement, examining each statement of the source code to determine if the statement resides in the logic flow path of the target statement, does not reside in the logic flow path to the target statement, or is undefined with respect to whether or not it resides in the logic flow path to the target statement, marking each statement as to the logic flow path determination of the examining step, generating a simplified display of representations of selected statements of the source code document based on the markings of the source code statements, such that representations of statements that do not reside in the logic path of the target statement are not displayed.

26. The device of claim 25 further comprising stored program instructions which when executed performs the steps of prior to the examining step, scanning all lines of the source code to determine lines that contain multiple statements, and generating a new copy of the source code in which each statement is contained on a separate line, and the step of examining each statement further comprises the step of examining each line of the new copy of the source code.

27. The device of claim 26 further comprising stored program instructions which when executed performs the steps of displaying statements that appear in the source code document in a multi-statement line format in the same multi-statement line format as the source code document.

28. The device of claim 25 wherein the stored instructions that generate a simplified display of the source code document further comprises instructions that when executed perform the step of displaying representations of all statements that reside in the path of the target statement.

29. The device of claim 25 wherein the stored instructions that generate a simplified display of the source code document further comprises instructions that when executed perform the step of displaying only a representation of the target statement and representations of conditional statements that reside in the path of the target statement.

30. The device of claim 29 further comprising stored instructions that when executed perform the step of displaying representations of all statements in the path of the target statement that implement a statement grouping function, such as DO groups, LOOP groups and PROCEDURE groups.

31. The device of claim 25 wherein the stored instructions that generate a simplified display of the source code document further comprises instructions that when executed perform the step of displaying simplified flow diagrams of all statements that reside in the path of the target statement.

32. The device of claim 31 wherein the stored instructions that generate a simplified display of the source code document further comprises instructions that when executed perform the step of displaying simplified flow diagrams of all statements for which it cannot be determined if they reside in the path of the target statement or not.

33. The device of claim 31 or claim 32 wherein the stored instructions that generate a simplified display of the source code document further comprises instructions that when executed perform the step of displaying program flow as a line drawing.

34. The device of claim 33 wherein the stored instructions that generate a simplified display of the source code document further comprises instructions that when executed perform the steps of representing statements in the path of the target statement as lines with a first visual attribute, and representing statements for which it cannot be determined if they are in the path of the target statement or not as lines with a second visual attribute.

35. The device of claim 34 further comprising stored instructions that when executed perform the step of annotating the lines with indicia identifying the associated statements.

36. The device of claim 34 further comprising stored instructions that when executed perform the step of annotating some of the lines with indicia identifying associated groups of statements.

37. In a computer system having a memory, a storage device and an output device, a method of generating software source code path flow displays relative to a target statement of a source code document, comprising the steps of reading a source code document from the storage device into the memory, parsing the source code document into a statement table, classifying each statement of the statement table into a statement type, identifying the target statement in the statement table, examining each statement of the statement table to determine if the statement resides in the logic flow path of the target statement, does not reside in the logic flow path to the target statement, or is undefined with respect to whether or not it resides in the logic flow path to the target statement, path marking each statement in the statement table as to the logic flow path determination of the examining step, generating a display on the output device of representations of the statements in the statement table that are marked as being in the path of the target display.

38. The method of claim 37 wherein the step of generating a display further comprises selecting the representation used for the display of a statement based in part on the classification of statement type.

39. A computer system having a memory, a storage device and an output device, for generating software source code path flow displays relative to a target statement of a source code document, comprising means for reading a source code document from the storage device into the memory, means for parsing the source code document into a statement table, means for classifying each statement of the statement table into a statement type, means for identifying the target statement in the statement table, means for examining each statement of the statement table to determine if the statement resides in the logic flow path of the target statement, does not reside in the logic flow path to the target statement, or is undefined with respect to whether or not it resides in the logic flow path to the target statement, means for path marking each statement in the statement table as to the logic flow path determination of the examining step, means for generating a display on the output device of representations of the statements in the statement table that are marked as being in the path of the target display.

40. The computer system of claim 37 wherein the means for generating a display further comprises means for selecting the representation used for the display of a statement based in part on the classification of statement type.

41. A program storage device, readable by a machine including a memory and an output device, tangibly embodying program instructions executable by the machine to perform method steps for generating software source code path flow displays relative to a target statement of a source code document, said method when executed by the machine comprising the steps of reading a source code document into the memory, parsing the source code document into a statement table, classifying each statement of the statement table into a statement type, identifying the target statement in the statement table, examining each statement of the statement table to determine if the statement resides in the logic flow path of the target statement, does not reside in the logic flow path to the target statement, or is undefined with respect to whether or not it resides in the logic flow path to the target statement, path marking each statement in the statement table as to the logic flow path determination of the examining step, generating a display on the output device of representations of the statements in the statement table that are marked as being in the path of the target display.

42. The device of claim 41 wherein the program instructions for generating a display when executed further performs the step of selecting the representation used for the display of a statement based in part on the classification of statement type.

43. A method of generating software source code path flow displays relative to a target statement of a source code document, comprising the steps of identifying the target statement, examining each statement of the source code to determine if the statement resides in the logic flow path of the target statement, does not reside in the logic flow path to the target statement, or is undefined with respect to whether or not it resides in the logic flow path to the target statement, marking each statement as to the logic flow path determination of the examining step, generating a simplified display of the source code document based on the markings of the source code statements, prior to the examining step, scanning all lines of the source code to determine lines that contain multiple statements, generating a new copy of the source code in which each statement is contained on a separate line, wherein the examining step further comprises examining each line of the new copy of the source code, and wherein the step of generating a simplified display of the source code document further comprises the step of displaying statements that appear in the source code document in a multi-statement line format in the same multi-statement line format as the source code document.

44. A method of generating software source code path flow displays relative to a target statement of a source code document, comprising the steps of identifying the target statement, examining each statement of the source code to determine if the statement resides in the logic flow path of the target statement, does not reside in the logic flow path to the target statement, or is undefined with respect to whether or not it resides in the logic flow path to the target statement, marking each statement as to the logic flow path determination of the examining step, generating a simplified display of the source code document based on the markings of the source code statements, wherein the step of generating a simplified display of the source code document further comprises the step of displaying only a representation of the target statement and representations of conditional statements that reside in the path of the target statement.

45. The method of claim 44 further comprising the step of displaying representations of all statements in the path of the target statement that implement a statement grouping function, such as DO groups, LOOP groups and PROCEDURE groups.

46. Apparatus for generating software source code path flow displays relative to a target statement of a source code document, comprising means for identifying the target statement, means for examining each statement of the source code to determine if the statement resides in the logic flow path of the target statement, does not reside in the logic flow path to the target statement, or is undefined with respect to whether or not it resides in the logic flow path to the target statement, means for marking each statement as to the logic flow path determination of the examining step, means for generating a simplified display of the source code document based on the markings of the source code statements, means for scanning all lines of the source code prior to the examining step to determine lines that contain multiple statements, and means for generating a new copy of the source code in which each statement is contained on a separate line, wherein the means for examining each statement further comprises means for examining each line of the new copy of the source code, and the means for generating a simplified display of the source code document further comprises means for displaying statements that appear in the source code document in a multi-statement line format in the same multi-statement line format as the source code document.

47. Apparatus for generating software source code path flow displays relative to a target statement of a source code document, comprising means for identifying the target statement, means for examining each statement of the source code to determine if the statement resides in the logic flow path of the target statement, does not reside in the logic flow path to the target statement, or is undefined with respect to whether or not it resides in the logic flow path to the target statement, means for marking each statement as to the logic flow path determination of the examining step, means for generating a simplified display of the source code document based on the markings of the source code statements, wherein the generating means further comprises means for displaying only a representation of the target statement and representations of conditional statements that reside in the path of the target statement.

48. The apparatus of claim 47 further comprising means for displaying representations of all statements in the path of the target statement that implement a statement grouping function, such as DO groups, LOOP groups and PROCEDURE groups.

49. A program storage device readable by a machine, tangibly embodying program instructions executable by the machine to perform method steps for generating software source code path flow displays relative to a target statement of a source code document, said method when executed by the machine comprising the steps of identifying the target statement, examining each statement of the source code to determine if the statement resides in the logic flow path of the target statement, does not reside in the logic flow path to the target statement, or is undefined with respect to whether or not it resides in the logic flow path to the target statement, marking each statement as to the logic flow path determination of the examining step, generating a simplified display of the source code document based on the markings of the source code statements, prior to the examining step, scanning all lines of the source code to determine lines that contain multiple statements, and generating a new copy of the source code in which each statement is contained on a separate line, wherein the step of examining each statement further comprises examining each line of the new copy of the source code, and displaying statements that appear in the source code document in a multi-statement line format in the same multi-statement line format as the source code document.

50. A program storage device readable by a machine, tangibly embodying program instructions executable by the machine to perform method steps for generating software source code path flow displays relative to a target statement of a source code document, said method when executed by the machine comprising the steps of identifying the target statement, examining each statement of the source code to determine if the statement resides in the logic flow path of the target statement, does not reside in the logic flow path to the target statement, or is undefined with respect to whether or not it resides in the logic flow path to the target statement, marking each statement as to the logic flow path determination of the examining step, generating a simplified display of the source code document based on the markings of the source code statements, in which the simplified display contains only a representation of the target statement and representations of conditional statements that reside in the path of the target statement.

51. The device of claim 50 further comprising stored instructions that when executed perform the step of displaying representations of all statements in the path of the target statement that implement a statement grouping function, such as DO groups, LOOP groups and PROCEDURE groups.

\* \* \* \* \*